United States Patent [19]

Pasfield

[11] Patent Number: 5,076,682

[45] Date of Patent: Dec. 31, 1991

[54] TELEMICROSCOPIC APPARATUS ON SPECTACLES

[76] Inventor: Michael T. Pasfield, 20102 Kinloch, Redford, Mich. 48240

[21] Appl. No.: 374,263

[22] Filed: Jun. 29, 1989

[51] Int. Cl.⁵ .............................................. G02C 1/00
[52] U.S. Cl. ....................................... 351/158; 351/41
[58] Field of Search ............... 350/145, 146, 547, 548, 350/549; 351/41, 158

[56] References Cited

U.S. PATENT DOCUMENTS

| | | | |
|---|---|---|---|
| 4,195,918 | 4/1980 | Freche et al. | 350/145 |
| 4,364,645 | 12/1982 | Feinbloom | 351/158 |
| 4,795,235 | 1/1989 | Spitzberg | 351/158 |

FOREIGN PATENT DOCUMENTS 3530649  3/1987  Fed. Rep. of Germany ...... 351/158

*Primary Examiner*—Rodney B. Bovernick

[57] ABSTRACT

Telemicroscopic spectacles including a carrier eyeglass frame, spectacle lenses and a small or miniture multiple lens optical instrument mounted posteriorly relative to at least one of the lenses so as to extend from a front lens of the instrument disposed at or about such spectacle lens toward the wearer's eye such that a rear exit lens of the instrument is disposed adjacent the wearer's eyelash. The optical instrument is adjustable in optical length for focal adjustment by finger manipulating a focusing drive mounted on the spectacles and operable from at or near the outer periphery of the associated spectacle lens. The instrument is also supported on the spectacles from at or near the outer periphery of the associated spectacle lens. Several embodiments of remote focusing drives and remote support attachments are disclosed.

24 Claims, 4 Drawing Sheets

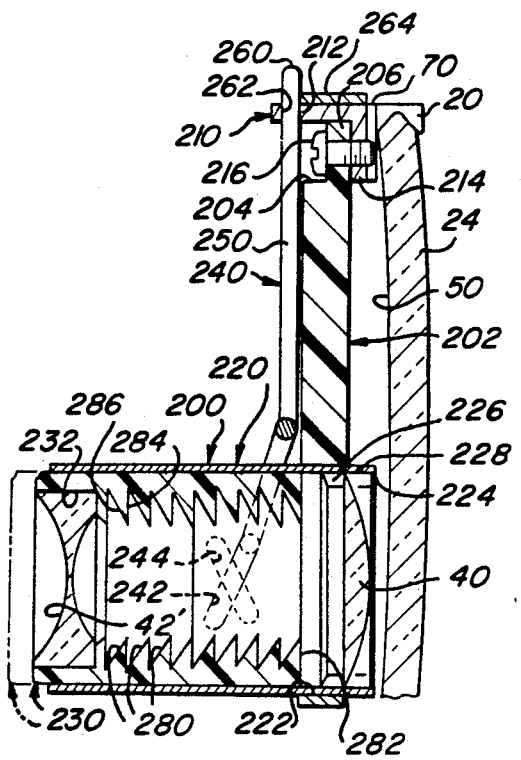

TELEMICROSCOPIC APPARATUS ON SPECTACLES

TECHNICAL FIELD

This invention relates to vision enhancing systems and apparatus, and more particularly to ophthalmic attachments for eyeglass lenses and spectacles such as miniaturized telemicroscopes mounted to spectacle lenses.

BACKGROUND OF THE INVENTION

Presently there exist various designs of magnifying spectacles of the type in which a magnifying lens system is arranged in front of each eye of the user, the lens system preferably being designed in the manner of a Galilean telescope. The magnifying lens system may be either mounted separately in a frame for attachment to spectacles, or more advantageously may be combined with corrective lenses of a pair of spectacles. In some of such systems, the magnifying lenses are attached to a support in a position of convergence corresponding to the working sight distance, the support itself being attached to the bridge of the eyeglass frame. In other systems of this type, the magnifying lens systems are directly joined to the corrective lenses of the spectacles, such as by cementing a holding ring to the corrective lens or mounting the telescope in a through-opening provided in the lens for receiving the scope.

Such magnifying spectacles are useful where magnified, sharp, critical, prolonged and comfortable vision is required, as for example in surgery, dental work, dermatological work and in the assembly of miniature parts. Small telemicroscopes mounted to the lenses of otherwise conventional spectacles have also proven helpful to individuals who suffer low vision The term telemicroscopes is intended to include both instruments used to make distant objects appear nearer, and thus larger (telescopes), and instruments used to make near objects appear larger (microscopes). Examples of particular telemicroscopic arrangements which have been used by low vision individuals, as well as by the normally sighted for special work applications are to be found in the U.S. Edwards Pat. No. 4,540,238 and in the patents cited as references therein, as well as in the Pekar et al U.S. Pat. No. 4,704,000 and the patents cited as references therein.

The bilevel telemicroscopic apparatus of the aforementioned Edwards '238 patent is considered advantageous in providing light weight telemicroscopic spectacles which, to the casual observer, appear to be completely conventional while providing a significant depth of view and a bilevel vision effect. The Edwards telemicroscopic spectacles accomplish this by directly mounting the telemicroscopes fixedly and permanently into the spectacle lenses so as to extend rearwardly therefrom toward the wearer's eyes, but not so as to protrude forwardly beyond flush with the front or outer surface of carrier lenses. The telemicroscope is miniaturized in order to fit in the small space between the cornea of the eye of the wearer and the eyeglass lens. The scope is either adhesively attached to the rear surface of the carrier lens or fixedly mounted in a through opening in the carrier lens so that the front surface of positive element of the scope rests flush with the front surface of the carrier lens. In either event, the negative element of the scope is positioned no closer than eye lash length from the eye ball.

The Edwards telemicroscopes are adjustable by a screw connection of the positive and negative lenses so that special prescriptions are not required. The short length of the telemicroscope lens contributes to a significant field of view of the scope. Due to its miniature size, the telemicroscope can be positioned with one edge at about the eyes central viewing axis. Thus, with a scope having an outer diameter of less than 10 mm as described above, and with the optic axis of the scope within 5 mm of the eye's central viewing access, bilevel vision is thereby made possible. In bilevel vision, the patient observes the regular field of view and the smaller magnifying field of use simultaneously with no confusion. With the bilevel effect, the patient need not focus first on the regular view and then the magnifying view; both views are continuously apparent to him.

However with the aforementioned Edwards telemicroscope-equipped spectacles, as well as with other prior art magnifying spectacles, the magnifying lens system must be adjusted relative to the pair of eyes and to each other in a manner such that the axes of the system coincide with the lines of vision of the pair of eyes to an object point disposed on the focal plane of the magnifying lens system. In magnifying spectacles in which the magnifying lens systems are directly joined to the spectacle corrective lenses, particularly when permanently mounted interiorly to or rearwardly of the lenses as in the aforementioned Edwards patent system, such adjustment offers some difficulties. Although the scopes are adjustable in focus by screw threaded telescopic mounts of the front and rear lenses, such focus adjustment cannot be done by the user himself while wearing the spectacles in normal position due to the inaccessability of the scopes disposed in the limited space between the corrective lenses and the eye balls of the user. Accordingly, adjustment must be done with the eyeglasses removed, then the same refitted and the focus adjustment checked, and so on through a trial and error iteration process. Preferably such focus fitting is done by the attending optician, and hence accurate adjustment of the magnifying lens system is rendered even more difficult because the optician is not able to effect the adjustment from his own view, but only according to the statements made by the user.

In addition, such permanent scope mounting employed in prior art telemicroscopes renders the fitted scope-lens unsuitable for making later centering readjustments laterally of the scopes relative to the spectacle lenses. This often creates a problem for low vision wearers who frequently have a need for remounting and refitting of the scope-lens device a second or third time in order to achieve wearer acceptability. This refitting is costly and time consuming because, in each event, a new "carrier lens" has to be constructed in order to move the scope mounting point to a different location laterally of the lens.

Another problem created when mounting a scope in a lens through-opening in such prior art systems is their requirement that the lens be custom bored and/or machined or to be a cemented substructure, and the lens utilized as a means of support. Such systems may also require special shaping of the lenses or frames, or are limited to the use of one specific design or shape of eyeglass frames and lenses. In addition, if the lens material needs to be bored to mount the scope, the lens material choice is limited, i.e., lens material which provides an acceptable degree of shatter resistance is difficult if not impossible to bore, at least in an economical manner.

Through-lens scope mounting is also disadvantageous when it is desired to align the scope axis at or near the optical center of the associated eyeglass lens. The minimum axial length of the through-lens opening needed to provide adequate cantilever mounting support results in the outer periphery of the lens being too thick to be acceptable when ground to meet high myoptic prescriptions.

Other problems associated with prior art telemicroscope-carrier lens combinations is their inability to implement needed cylindrical correction for astigmatic viewer correction since the scope lens system is not coupled in series with the carrier lens correction. Although theoretically it is possible to build such correction into the scope lenses, since every spectacle lens prescription is different, and if the spectacle prescription is substantial and correction for astigmatism is required, determination of implementation or deletion of spectacle prescription requirements should desirably be left completely to the qualified vision care specialist or certified low vision specialist who can prescribe and craft the necessary corrections in the spectacle lens independently of the scope lens system.

Another problem associated with microtelescopes in general is the need to direct the light effectively, to refract light and to make the highest and best possibly use of available light, while at the same time maintaining the widest possible field of vision. This parameter of a telemicroscope is often referred to as its "light gathering ability". Since no more light then enters the objective lens can effectively be refracted and exit the pupil lens, it is of the utmost importance that this light be reduced or dimensioned as little as possible prior to exit from the scope, either by the medium used for refraction or by any other internal device designed to redirect light or remedy ambient light reflection within the telemicroscope. In the aforementioned prior art Edwards '238 patent, this problem is approached by providing a diaphragm diameter based on an established ratio of tube length to thereby determine the necessary diaphragm diameter. This diaphragm diameter method, while eliminating a fair portion of ambient light reflection, does however decrease the field of view substantially, since it simply reduces the internal diameter of the tube to control the amount of light, thereby reducing the ambient light. Other prior art approaches to this problem include the use of a "dull black finish" on the internal surface of the device for the reduction of ambient light reflection, but this has not been as effective as desired in achieving reduction of ambient light reflection.

OBJECTS OF THE INVENTION

Accordingly, it is an object of the present invention to provide magnifying spectacles of the aforementioned types with an improved device which overcomes the aforementioned problems and enables the user to effect accurate positioning and adjustment of the magnifying lens system in a simple manner while wearing the spectacles and without requiring removal of the spectacles from their normal mounted position on the head of the user.

Another object is to provide an improved focusing mechanism for telemicroscopic bioptic apparatus such as the aforementioned Edwards type which enables focusing of the telemicroscopes while viewing therethrough with the eyeglasses placed in normal position on the head of the viewer to thereby obtain more accuracy in initial adjustment to the viewer's visual needs by the attending optician, as well as facilitating readjustment of focus by the user at any time while in viewing use.

A further object is to provide an improved magnifying device for spectacles of the aforementioned character which is inexpensive in construction, readily mountable in any desired position relative to the associated lens of the spectacles, which is lightweight and highly reliable in operation, and which is cosmetically pleasing to the wearer.

Yet another object is to provide an improved means for mounting a telemicroscope relative to an associated spectacle lens which would not require permanent support by the lens, and thus facilitates fitting and refitting of the scope to the lens and the patient and provides a substantial reduction in costs of these procedures.

BRIEF DESCRIPTION OF THE DRAWINGS

Other objects as well as features and advantages of the present invention will become apparent from the following detailed description taken in conjunction with the appended claims and accompanying drawings wherein:

FIG. 8 is a fragmentary vertical cross-sectional view taken on the line 8—8 of FIG. 7.

FIG. 9 is a fragmentary perspective rear view of a fourth embodiment of the invention illustrated by itself without illustrating the associated eyeglass frame and lens.

FIG. 10 is a fragmentary perspective rear view of a fifth embodiment of the invention, without the associated eyeglass frame or lens being shown, and with a portion broken away to illustrate detail.

FIG. 11 is a fragmentary vertical section view taken on the line 11—11 of FIG. 10.

DETAILED DESCRIPTION OF THE INVENTION

FIRST EMBODIMENT

Figure 1:
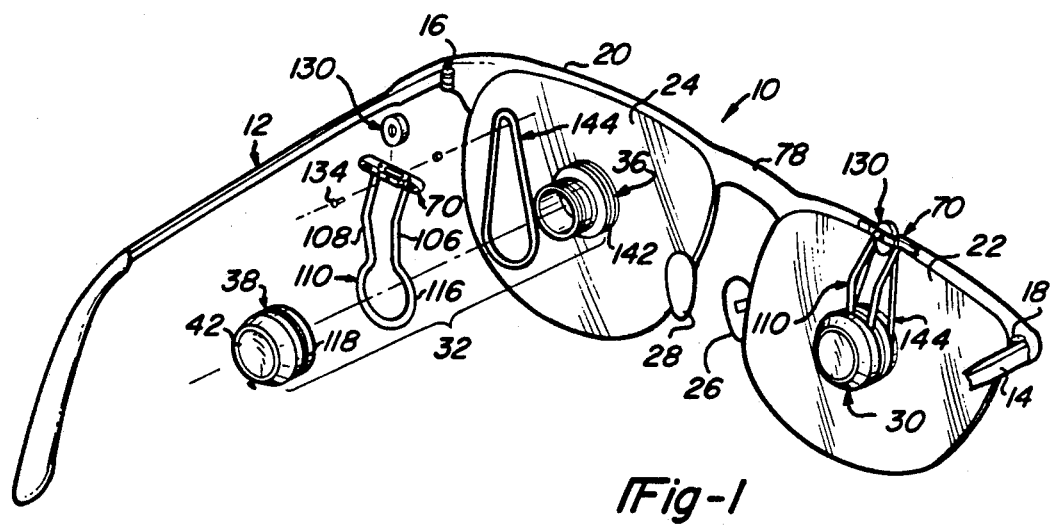
FIG. 1 is a fragmentary perspective view of one illustrative working embodiment of the invention applied to a conventional pair of eyeglasses, a dual viewer-adjustable telemicroscope apparatus and system of the invention being shown with the right hand telemicroscope assembled and attached to the right hand portion of the eye wire in operative position with the right hand lens of the spectacles, and the left hand telemicroscope being shown in exploded perspective relationship with the left lens.

Referring in more detail to FIG. 1, a conventional pair of eyeglasses 10 is illustrated in perspective as viewed from above and to the side and rear thereof, and comprises the usual left and right temples 12 and temple 14 pivotally connected by conventional frame hinges 16 and 18 respectively to the eye wire 20 of the frame. Right hand and left hand lenses 22 and 24 are conventionally mounted in frame 10, along with associated right and left nose pieces 26 and 28.

Eyeglasses 10 are equipped, in accordance with the present invention, with a pair of telemicroscopes 30 and 32 which are identical with one another, scope 30 being shown in the assembled relation mounted to the eye wire 20 in association with right lens 22 and scope 32 being shown in exploded perspective relationship associated with left lens 24. Inasmuch as scopes 30 and 32 are identical, only scope 32 will be described in detail in conjunction with FIGS. 1, 2 and 3.

Figure 3:
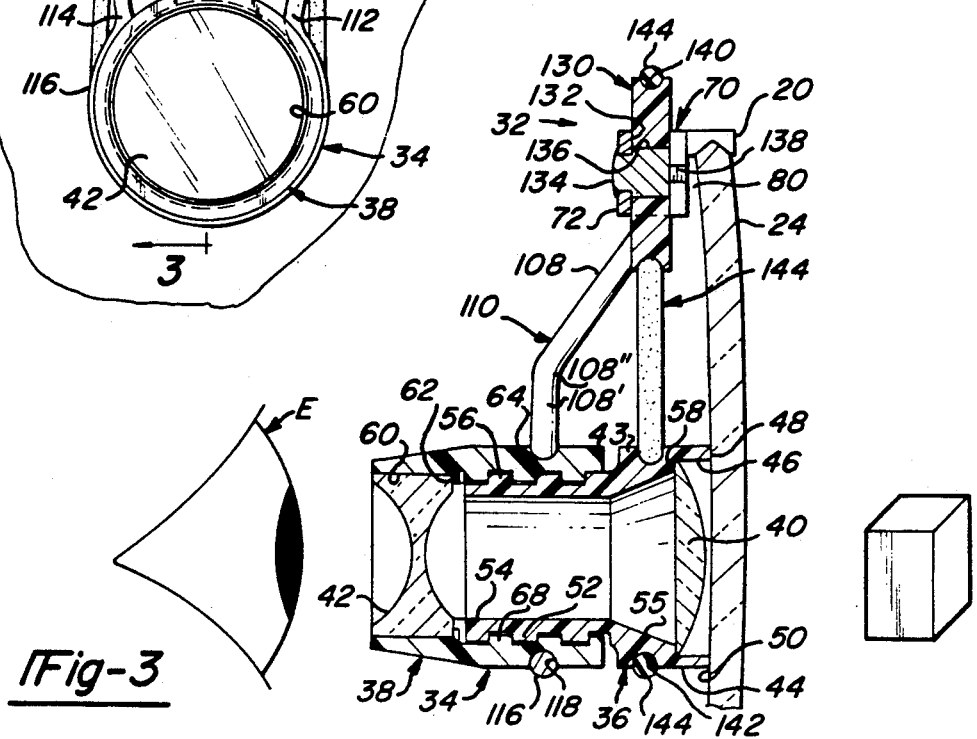
FIG. 3 is a fragmentary cross-sectional view taken on the line 3—3 of FIG. 2 with the telemicroscopic device attached to the eye wire of the glass frame and illustrating the relationship of the eyeball of the viewer with the eyeglasses positioned normally on the head of the viewer.

As best seen in FIG. 3, adjustable scope apparatus 32 includes a focus-adjustable telemicroscope 34 comprising a front barrel 36 and a rear barrel 38 respectively housing a positive objective lens 40 and a negative pupil exit lens 42 corresponding, if desired, to the positive lens 11 and negative lens 16 of the aforementioned Edwards '238 patent. Front barrel 36 preferably has an enlarged head 43 at its forward end with cylindrical outer surface 44 and a counter bore 46 opening through the front end of the barrel for receiving and mounting lens 40. The annular front face 48 of head 43 of barrel 36 is adapted to have abutting, slidable contact with the inner surface 50 of the associated eyeglass lens 24 to thereby hold the outer apex of lens 40 spaced with a slight pre-determined clearance from surface 50. Barrel 36 has a reduced diameter neck 52 extending rearwardly from barrel head 43 with a cylindrical bore 54 opening at the rear end of the neck and opening forwardly into a frustoconical bore 55 which in turn terminates at a shoulder 58 of counter bore 46. The outer periphery of neck 52 is configured to provide a helical buttress thread 56 which may be 16 threads per inch for a minor thread diameter of 0.250-0.260 inches.

Rear barrel 38 is likewise provided with a counter bore 60 opening at the rear end of the barrel and terminating forwardly at a shoulder 62 for receiving and mounting negative lens 42. Barrel 38 has a sleeve portion 64 dimensioned to threadably telescope onto neck 52 of barrel 36 and has mating internal threads 68 which threadably engage threads 56 for screw adjustment of the axial distance between lenses 40 and 42 to thereby provide an adjustable focus scope.

In accordance with one important feature of the present invention, scope 34 is indirectly mounted in sliding abutment to lens 24 by a supporting frame work fixed to the eye wire 20. This supporting frame work includes a main frame mounting plate 70 with an enlarged center section 72 and coplanar right and left hand arms 74 and 76 extending integrally from the opposite ends of block 72. Frame plate 70 is suitably dimensioned relative to the dimensions of eye wire 20 for mounting to the interior surface of the eye wire approximately midway between the bridge 78 of frame 10 and the associated temple hinge point. For example, in one illustrative embodiment, the length of frame 70 is approximately 0.986 inches and the height of the frame is approximately 0.130 inches. The front face 80 of frame plate 70 is smooth and continuous from end to end of the frame but the rear face 82 of the central portion of the frame protrudes rearwardly from the rear faces 84 and 86 of arms 74 and 76. Each arm 84, 86 has an oval mounting slot 88 and 90 respectively each with a surrounding marginal shoulder 92 and 94 respectively. Suitable filister head mounting screws (not shown) may be individually inserted through slots 88 and 90 and the head of the screw seated on associated shoulders 92, 94. The ovality of the slots permits lateral adjustment of the main frame relative to suitable screw mounting holes in eye wire 20 (not shown).

The main frame plate 70 may be made of brass with a black oxide finish or aluminum with a brown anodized finish, or may be made of a suitable clear plastic material such as high tensile injection molded plastic material. If metallic, frame plate 70 may be soldered instead of screw fastened to the eye wire frame, or alternatively may be adhesively secured thereto whether the materials are plastic or metal.

Each of the arms 74 and 76 is provided with a downwardly-opening blind socket bore 98 and 100 respectively which extend vertically therein between the frame center portion 72 and the associated arm slot. Sockets 98, 100 respectively receive the free end tangs 102 and 104 of arms 106 and 108 of a spring wire support yoke 110. The lower ends 112 and 114 of arms 106 and 108 are interconnected by a circular bite 116 which extends through an arc of about 270°. Bite 116 is received in an external annular groove 118 provided in sleeve 64 of rear barrel 38.

As best seen in FIGS. 1 and 3 each arm 106 and 108 respectively has a lower portion 106', 108' extending radially of barrel 34, and a respective upper portion 106", 108" inclined forwardly from the lower portion at an angle of about 30° (FIG. 3). Tangs 102 and 104 are bent from upper arm portions 106", 108" so as to extend vertically parallel to lower arm portions 106' and 108'.

It is also to be noted that arms 106 and 108 diverge upwardly and outwardly relative to one another from the scope 34 and define an included angle of about 20°.

In accordance with another feature of the present invention, support yoke 110 is made of suitable spring wire stock formed such that in the free state condition of yoke 110 tangs 102 and 104 are spaced slightly farther apart then their position in assembly with frame 70, and such that bite 116 lies in a plane inclined slightly forwardly from the radial plane of the bite in assembly with scope 34 as illustrated in FIG. 3. Hence when bite 116 is seated in barrel groove 118 prior to attachment of the yoke arms 106, 108 to main frame 70, tangs 102 and 104 must be squeezed toward one another in order to register with their associated sockets 98 and 100. This puts bite portion 116 under spring tension so that it securely frictionally grips sleeve 64 of the rear barrel 38, thus preventing rotation of barrel 38 relative to yoke 110. Moreover, due to the forward free-state inclination of bite 116, the arms 106 and 108 of the yoke must be yieldably deflected rearwardly a slight distance in order to bring the scope 34 to its abutment position as assembled against the lens 24 (FIG. 3). Hence, scope 34 is spring biased forwardly by yoke 110 to maintain surface 48 in sliding abutment with the interior surface 50 of lens 24 in the mounted position of frame plate 70 on eye wire 20. As shown, in FIG. 3, rear barrel 38 is fully telescopically screw threaded forward onto front barrel 36, and yoke deflection and hence forward spring biasing force exerted by yoke 110 is at a minimum.

In accordance with another feature of the present invention, forward lens barrel 36 may be rotated relative to rear barrel 38 to produce axial relative movement between the positive lens 40 and negative lens 42 to thereby adjust the focus of scope 34 while the scope is in mounted assembled relation with the eyeglasses 10, and also while the eyeglasses 10 are mounted in normal viewing position on the head of the viewer. This rotational focus adjustment is accomplished by operation of a miniature drive coupling between forward barrel 36 and main frame 70. A portion of the drive coupling protrudes beyond the periphery of the eyeglass frame 20 where the same is manually finger accessible to impart a driving force thereto.

Figure 2:
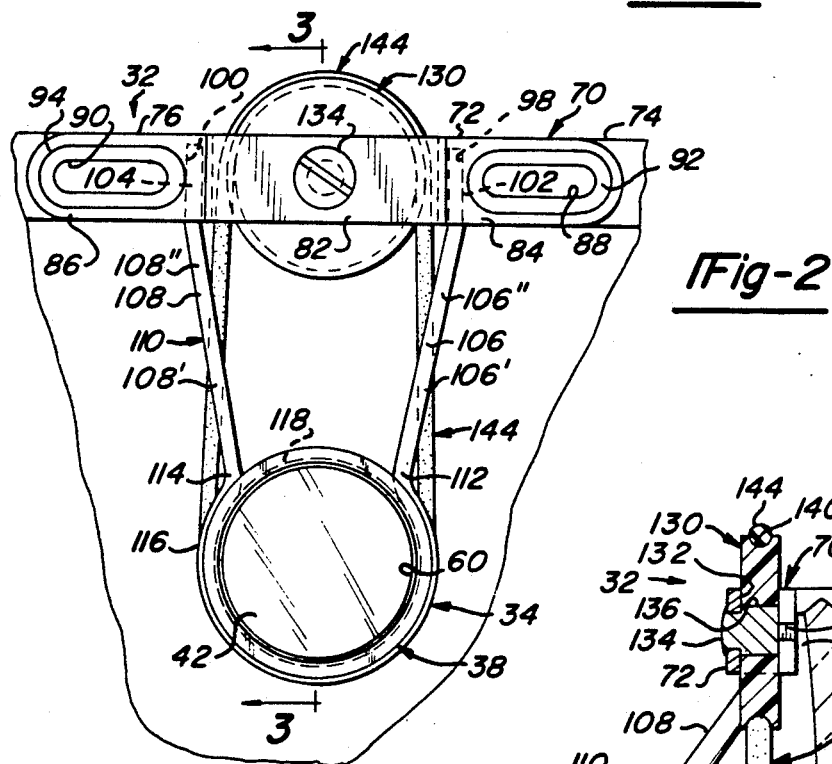
FIG. 2 is an elevational view of the telemicroscopic mounting and focus adjustment system shown by itself apart from the eyeglasses as seen from the eye of the user looking forwardly, and being greatly enlarged over the illustration of FIG. 1.

In the embodiment of the invention illustrated in FIGS. 1-3, this drive coupling comprises a pulley wheel 130 received within a vertically extending through opening 132 in central portion 72 of frame 70. Pulley wheel 130 is journalled for rotation on an axle pin 134 having a shank 136 inserted through an opening in the rear wall of portion 72 of the frame and through a hub bore of pulley 130. Pin 134 has a reduced diameter threaded stem 138 threadably received in the front wall of frame portion 72. Pulley 130 has an annular groove 140 coplanar with an annular groove 142 provided in head 43 of forward barrel 36. A rotational frictional driving connection between pulley 130 and barrel 36 is provided by a O-ring friction belt 144 trained at its upper end around pulley 130 by seating in groove 140 and trained at its lower end around barrel 36 by seating in groove 142. Preferably belt 144 is made of clear rubber with a diameter of about 1/32 of an inch. Wheel 130 is preferably made of clear plastic, such as Plexiglass or other polycarbonate material. It is to be noted that, as best seen in FIGS. 1 and 3, pulley 130 protrudes slightly above the plane of eye wire 20 and thus brings the upper end of belt 144 to a position above mounting frame 70 and eye wire 20 where the pulley and belt are readily accessible to the index finger of the eyeglass wearer or attending optician.

In operation, telemicroscopes 30 and 32 may be manually focused by the wearer while the wearer is sighting through the same with each eyeball E of the wearer-viewer positioned as shown in FIG. 3 relative to lens 42 of the associated scope 30, 32. The user applies finger pressure to the portion of belt 144 exposed above frame 70 as well as to the rim of wheel 130 to impart rotation to pulley 130 and, via belt 144 to the forward barrel 36 of the scope. The rear barrel 38, being restrained against rotation by yoke 110, will be threadably driven in an axial direction to increase or decrease its telescopic overlap with forward barrel 36, depending on the direction of belt rotation. The distance between the positive and negative lenses 40, 42 is thus readily adjustable to focus the scope as desired either by the wearer or attending optician while the wearer is sighting through the scope with the eyeglasses positioned normally on the head of the wearer. This feature, namely, focusing-while-wearing, has been found to greatly improve the accuracy of focus of this scope to accommodate the initial vision correction needed for the wearer, as well as to greatly facilitate use of the telemicroscope-equipped eyeglasses by the wearer by permitting refocusing on objects at different distances without removing the eyeglasses from the wearer. Conversion between telescopic and microscopic use of the scopes is also a simple matter with the externally-accessible focusing drive coupling of the invention.

It is to be noted that the spring biasing yoke 110 maintains the scope front barrel 36 in sliding abutment with the inner surface 50 of the associated lens 24 throughout the range of rotational telescopic focus adjustment of the front and rear barrels. This yoke spring force also insures sufficient frictional interengagement between the front and rear barrels to reliably maintain focus settings despite the normal vibrations and jars to which the eyeglasses are customarily subjected in use. Since the scope is not permanently affixed to its associated eyeglass lens, the set-up position of the scope on the lens may be varied at will within the limits of the adjustment of mounting frame 70.

The resilience of yoke 110 also helps accommodate, by flexure of arms 106 and 108, motion of the lower end 116 of the yoke with movement of rear barrel 38 during focusing. The bent or curved upper ends 102 and 104 can also move endwise slightly in their respective sockets 98 and 100 to help accommodate such yoke movement during focusing. Belt 144 insures that yoke ends 102 and 104 remain captured in slots 102 and 104 during such focusing motion. Alternatively, scope 32 may be designed such that end 48 is spaced from lens surface 50 except at the maximum telescope extension. In this event, yoke 110 is not subjected to any motion of its lower end 112-116 during focusing, and yoke ends 102 and 104 thus can be held immobile in their sockets 98 and 100.

It is also to be understood that the dimensions of yoke 110 and belt 144 may be suitably varied to increase or decrease the distance between support frame 70 and scope 34, i.e., to position scope either in an upper central or lower area of the associated eyeglass lens.

It is to be further understood that the telemicroscopic focus adjustment and support system of the invention can be mounted to other locations on the eyeglasses. For example, if a full loop eyeglass frame is provided, frame 70 can be mounted to the outer side or to the bottom run of the eyeglass frame, i.e., at 90° or 180° from that shown in FIGS. 1 and 3. So long as the portion of belt 144 trained around pulley 130 protrudes beyond the periphery of the eyeglass frame at a point where it is finger accessible, manual adjustment of focusing still can be accomplished with ease and accuracy by the wearer.

The use of a small diameter, transparent O-ring belt drive 144, coupled with the use of a fine diameter spring wire yoke 110, provides minimum obstruction to vision of the wearer when sighting through lens 24 only and not through the associated scope. This miniature and transparent support and drive mechanism also adds a minimum of structure which is well hidden behind the eyeglass lenses and hence is cosmetically attractive because it is relatively unnoticeable to others.

SECOND EMBODIMENT

Figure 4:
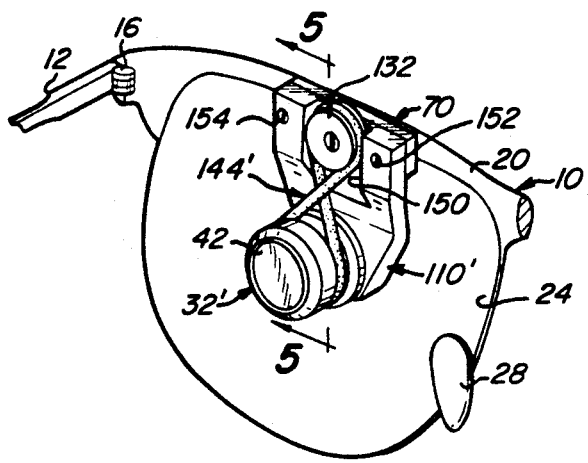
FIG. 4 is a fragmentary perspective rear view of a second embodiment of the invention shown applied to the left-hand lens and associated frame portion of the spectacle.
Figure 5:
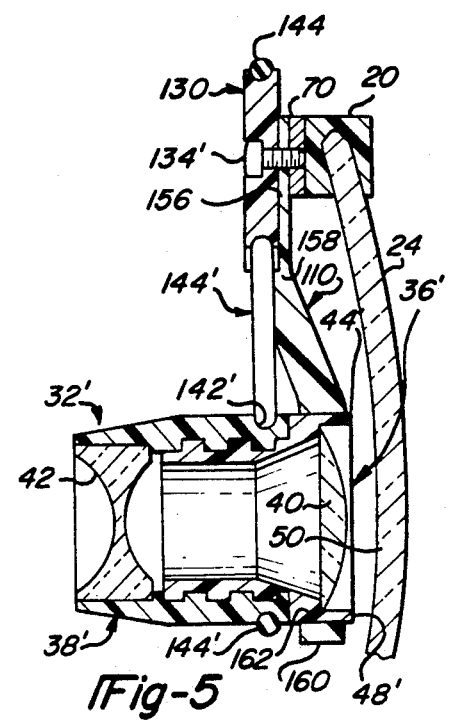
FIG. 5 is a fragmentary cross-sectional view taken on the line 5—5 of FIG. 4.

FIGS. 4 and 5 illustrate a second embodiment of the present invention wherein (as in subsequent embodiments described hereinafter) like reference numerals may be used to identify parts and elements previously described, and like reference numerals raised by a prime suffix may be used to illustrate parts alike in function to those previously described except as indicated hereinafter. Referring in more detail to FIGS. 4 and 5, an adjustable telemicroscope 32' is provided with the positive and negative lenses 40 and 42 similar to scope 32 of the first embodiment, and with a rear outside barrel 38' threaded onto a front barrel 36' to enable relative axial focusing motion of these parts in their associated lenses by rotation of barrel 38' about barrel 36'. An O-ring 144' is trained over pulley 130 and under a groove 142' provided in outer rear barrel 38' instead of in the front barrel 36' as in the first embodiment. As best seen in FIG. 4, belt 144' is given a half twist so that its runs cross in "X" fashion, thereby causing rotation of barrel 38' in the opposite direction from pulley 130. The twisted belt relationship increases the length of the contact of the belt loops over pulley 130 and barrel 38' to thereby increase the frictional grip of the belt on these parts, which may be advantageous in some designs and for some materials.

In the second embodiment of FIGS. 4 and 5, telemicroscope 32' is supported by a modified yoke 110' comprising an injection molded plastic part made from clear polycarbonate plastic or the like. Yoke 110' is generally V-shaped in elevation and has a notch 150 in its upper end to receive pulley 130 with a clearance therebetween. Screws 152 and 154 secure the upper arms of the yoke 110' to frame block 70, which in turn is secured to eyewire 20. As best seen in FIG. 5, support 110' is somewhat Z-shaped in side cross section so as to have an upper vertical portion 156 forming the upper spaced arms which define the notch 150, a forwardly and downwardly inclined portion 158, and a lowermost vertical portion 160. A cylindrical bore 162 in portion 160 receives the forward sleeve portion 44' of front barrel 36' with a press fit, augmented by adhesive as desired, to non-rotatably secure the front barrel 36' in support 110'. If desired, as seen in FIG. 5 the front edge 48' of forward barrel 36' may be disposed in abutment with the inner surface 50 of lens 24 instead of being spaced a slight distance therefrom as shown in FIG. 5.

The operation of the second embodiment of FIGS. 4 and 5 is quite similar to that of first embodiment of FIGS. 1-3 in that finger rotation of the upper exposed run of belt 144' and associated upper pulley 130 will produce rotation of the rotatable part of the two-piece telemicroscope, in this case the rear barrel 38', to provide remote drive focusing of telemicroscope 32'. Such focusing is readily done by the patient while wearing the eyeglasses equipment with the telemicroscope, both during initial fitting aided by the vision professional and during subsequent use by the wearer. Inasmuch as the wearer sights through a series array of the telemicroscope lenses 42 and 40 and the conventional eyeglass 50, astigmatism correction as required may be provided in lens 50 independently of the design of telemicroscopic lenses 40 and 42.

THIRD EMBODIMENT

Figure 6:
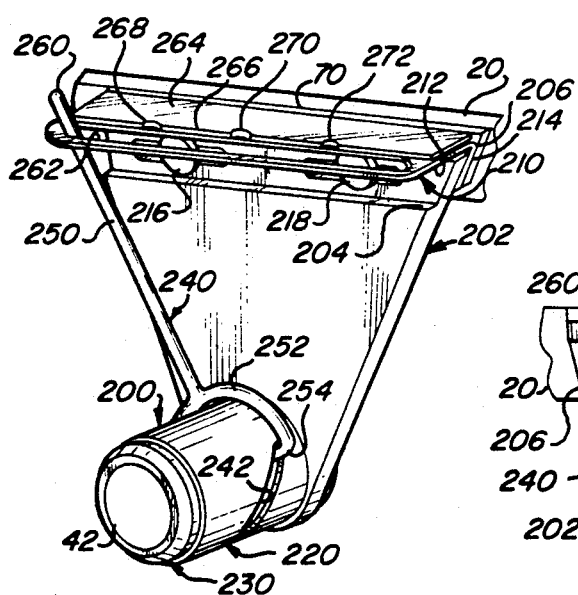
FIG. 6 is a fragmentary perspective rear view of a third embodiment of the invention with only a portion of the associated eyeglass frame illustrated in conjunction therewith.
Figure 7:
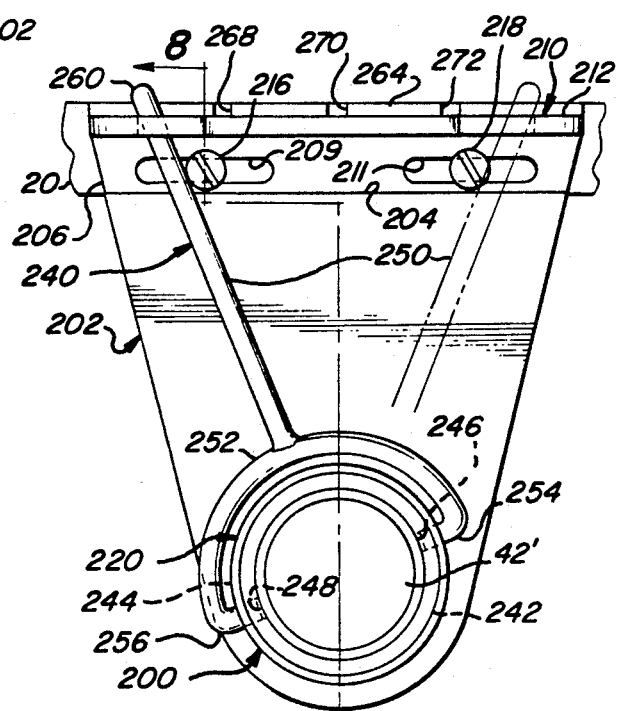
FIG. 7 is a rear vertical elevational view of the embodiment shown in FIG. 6.

A third embodiment of the present invention is illustrated in FIGS. 6, 7 and 8. In this embodiment a modified telemicroscope 200 is mounted in a V-shaped, clear plastic support 202 which is adjustably fastened at its upper end to frame 20. The upper edge of support 202 is formed with a horizontal notch 204 to provide a reduced thickness upper edge section 206. A pair of horizontally spaced mounting slots 209 and 211 are provided in edge section 206, these slots being of equal length and equally spaced horizontally from the center of support 202. An L-shaped mounting bracket 210, having a horizontal flange 212 and a vertical flange 214, co-extensive in length with upper edge section 206. Bracket 210 is fitted over upper edge section 206 as shown in FIGS. 6, 7 and 8 with flange 214 disposed between upper edge 206 and mounting plate 70, and with horizontal flange 212 extending rearwardly over edge 206 so as to protrude rearwardly beyond the rear face of support 202. Bracket 210 also has a pair of spaced mounting slots (not shown) identical to slots 209 and 211 and registerable therewith, through which a pair of mounting screws 216 and 218 are inserted via associated slots 209 and 211. Screws 216 and 218 are threadably received in threaded holes in plate 70 to thereby fasten support 202 and bracket 210 to eye frame 20 via mounting plate 70. Due to the provision of slots 209 and 211, support 202 may be adjusted laterally of lens 24, for a horizontal distance corresponding to the slot length, as desired to laterally position the telemicroscope 200 relative to eye frame 20, the associated carrier lenses 24 and 22 and the associated eyeball axis of the wearer. This may be done while wearing the eyeglasses with screws 216 and 218 slightly loosened until its proper position is set, and then the glasses removed to tighten the screws to fix the laterally adjusted position. If desired, bracket 210 may be held stationary during this lateral adjustment of support 202, or may be moved with support 202 to maintain the initial registry therewith or independently to an intermediate partially registered relationship.

Telemicroscope 200 comprises an outer, front barrel 220, which may comprise a thin cylindrical tube, the forward end of which is inserted through a mating bore 222 in support 202 and affixed therein as by press fit and/or adhesive. The open, forward end 224 of barrel 220 receives a positive lens 40 held in place therein by a pair of press-in-mounting rings 226 and 228 (FIG. 8).

Telemicroscope 200 also has a rear inner barrel 230 of generally tubular form which is received telescopically within forward barrel 220 with a smooth sliding fit. A negative exit pupil lens 42' is slidably inserted into a bore 232 opening at the rear end of barrel 230 and is suitably secured therein, as by press fit and/or adhesive.

Controlled telescopic motion of barrel 230 in barrel 220 to produce relative axial movement of lenses 40 and 42' to thereby focus telemicroscope 200 is readily obtained in this embodiment through finger operation of a control lever 240. To this end, forward barrel 220 is provided with a pair of diametrically opposed slots 242 and 244, illustrated in phantom in FIG. 8, which may be oppositely inclined at an angle of say 25° to the axis of scope 200 so as to function as interrupted helical threads. Barrel 230 is provided with a pair of diametrically opposed blind holes 246 and 248 (FIG. 7) which register with slots 242 and 244 respectively. Lever 240 comprises an upwardly extending arm 250 joined at its lower end to a semicircular bail wire 252 having inturned ends 254 and 256 which pass through slots 242 and 244 respectively and snap into holes 246 and 248 in barrel 230. Thus by swinging arm 250 in an arc through a plane of travel parallel to the paper in FIG. 7, from the solid line to the extreme opposite phantom line positions shown in FIG. 7, barrel 230 will be rotated by bail 252 while being screwed or cammed axially against slots 242 and 244 to move barrel 230 from its full forward position shown in solid lines in FIGS. 6-8 rearwardly to its rear most end of limit of travel as indicated in phantom in FIG. 8.

To control motion of lever 240, the upper end 260 of arm 250 projects through and protrudes above a guide slot 262 provided in flange 212 of bracket 210. The opposite ends of slot 262 serve as positive stops that define the end limits of swinging motion of arm 250 by their abutment therewith. Preferably, predetermined intermediate adjustment positioning of lever 240 between its end limit positions is obtained by providing a plastic stop plate 264 fixed as by adhesive to the upper surface of flange 212 and co-extensive therewith. The rearwardly facing edge 266 of plate 264 is provided with stop notches 268, 270 and 272 spaced therealong at predetermined locations. Edge 266 of plate 264 overhangs slot 262 slightly so that notches 268-272 are not blocked by the forward edge of slot 262. Plate 264 may be made of soft resilient material and disposed with its edge 266 in slight rubbing contact with arm 250 so that it can be slid along edge 266 but with some resistance to such motion being offered by the fit, and so that, when arm 250 registers with any one of the slots 268, 270 or 272, arm 250 will be yieldably retained in such selected position by the associated notch.

In accordance with another feature of the embodiments of FIGS. 6, 7 and 8, barrel 230 of telemicroscope 200 is provided with a light baffel system comprising a plurality of internal annular teeth 280 (FIG. 8) formed to define the inner periphery of barrel 230 between exit lens 42' and the front face 282 of barrel 230. Teeth 280 are formed with a front face 284 disposed in a plane perpendicular to the axis of barrel 230. The rear face 286 of each tooth has a frusto-conical surface disposed at an angle of 30° relative to the face 284. Teeth 280 thus define grooves individually therebetween which have a depth in one working embodiment of approximately 0.040 inches. The grooves defined by teeth 280 eliminate any adverse reflective surface within barrel 230, i.e., light passing through the objective lens 40 to the exit lens 42' is not provided with any surface from which ambient light can be reflected or scattered to the negative pupil exit lens 42'. This arrangement insures that no flat reflective surface is present internally of barrel 230 that is visible to the users eye when viewed through lens 42'. Ambient light within the barrel does not reflect off the sharp points or peaks that make up the light baffle system of teeth 280.

Thus, with this light-baffle system, when the wearer looks into lens 42', he observes no reflection of ambient light from the internal surfaces of barrel 280 but rather simply sees the total field of view created by the diameter of the objective lens 40 in conjunction with lens power and any given focal length. Indeed, this total field of view appears as though it is surrounded by a thin line of pitch black due to the absence of internal reflection. As a result, the image seen by the user provided by the lens system 40 and 42' appears extremely clear and free from excessive amounts of blue fringe even without the use of acromatic objective lenses. Thus the problem of ambient light reflection internally of the telemicroscope, which otherwise would tend to create in the image seen by the viewer a hazy, unclear condition or an image surrounded by halos, otherwise known as "fringe", is obviated by the light baffle system 280. In addition, this baffle structure does not reduce the internal diameter of barrel 230 to any substantial degree, thereby leaving the largest possible field and most use of available light.

The embodiment of FIGS. 6, 7 and 8 is also advantageous with respect to several other features embodied therein. The provision of the control arm with the protruding tip 260 disposed above the level of eye frame 20 provides the "remote" control means, in the fashion of a finger tip slide control for adjustably focusing the telemicroscope 200 while the viewer is wearing the eyeglasses and sighting through the telemicroscopes. This enables the viewer to focus from distance to near focal point, or vice versa, in a very practical and usable way. In the embodiment illustrated in FIGS. 6-8, the guide slot 262 provides a means for stopping the slide focus arm 250 in the viewers full left position, which constitutes the distance or infinity focused position. Conversely, the right hand end of slot 262 stops arm 250 in the viewers full right position, which is the near focus position of the telemicroscope. Due to the predetermined positive stopping positions of the focus bar 240, it is possible for the viewer-wearer to change or alternate focus without having to search for optimum focus position, for example, from the near to infinity positions, and vice versa, in a split second, making the wearer more functional relative to this vision aid. In addition, the intermediate stops provided by the notches 268-272 provide a simple and reliable means for cablibrating focus points of a telemicroscope which can be predetermined to be suitable for distances adapted to various occupations or functions.

The pointed end 260 of the control bar 240, protruding upwardly from the bracket 210 is advantageous for diabetic individuals, who are commonly low vision wearers of small or miniaturized telemicroscopes mounted to spectacles or spectacle lenses. Diabetic patients commonly suffer loss of circulation to extremities such as their finger tips and consequently some loss of touch sensitivity. Imparting a sliding motion by resting the finger on tip 260 has been found to be easier for suffers of such conditions than imparting the rotational motion of the embodiments of FIGS. 1-5.

Since the slide track bracket 210 is provided with slots corresponding to slots 208 and 210, and may be moved bodily with support 202 when making lateral adjustment of the telemicroscope relative to the spectacle lens, there need be no alteration in the focus position established by the control bar 240 even when displaced such lateral shifting of support 202. However, the converse is also possible when desired for shifting range and limits for particular viewer conditions or applications. Relative shifting movement between bracket 210 and support 202 is then employed to this end.

It is to be further understood that, because the spectacle lens 24 is not an integral part of the telemicroscope 200 and associated support 202, the spectacle lens may be changed to accommodate prescription changes etc. without disturbing or creating a need to remount the telemicroscope or scopes. Moreover, the lateral adjustment capability after the device has been mounted to the conventional spectacle frame, and while the wearer is viewing through the telemicroscope, enable optimum lateral centering to be readily obtained. Readjustment is also readily done without necessity of replacing the carrier lens, as necessitated in the prior art permanently fixed-mount telescopic devices.

It is also to be noted that cylindrical, otherwise known as astigmatic, correction is implemented automatically in low to moderate power spectacle prescription applications since the device of the invention is disposed completely behind the rear face 50 of the associated spectacle lens, and thus places the astigmatic connection of lens 24 in series with the scope lenses.

The overall accommodations capability of the third embodiment of FIGS. 6-8 is superior to telemicroscopes using longer focal lengths and greater vertex distances. The shorter focal length of the higher dioptric power lenses 40 and 42' used in this embodiment creates a pupil exit arrangement of light rays that are omitted at a broader inverted angle. The broader light exit causes the path of light diverging from the pupil exit lens 42' to be approximately equivalent to the convergence angle of light rays that occurs between the refraction of the cornea, and that of the crystalline lens of the human eye. Due to the short focal length of the high dioptric lens power, a very small degree of variation in the axial distance between positive and negative lens 40 and 42' is required. For example, in one working embodiment constructed to FIGS. 6-8, the variation in distance required to move from a fully focused infinity focal point to a near focal point of six inches is approximately 0.047 inches of axial travel of lens 40 and 42' relative to one another. Hence, in this embodiment, the degree of such axial relative movement required to accommodate a human refractive error of plus or minus 10.00 diopters is minimal and is indeed in the range of 0.007 inches.

In one working embodiment constructed pursuant to FIG. 6, 7 and 8, the following dimensional relationships were observed:
- Outer diameter of barrel 220—0.375 inches
- Inner diameter of barrel 220—0.345 inches
- Axial length of barrel 220—0.560 inches
- Width of slots 242, 244—approximately 0.040 inches
- Angulation of slots 242, 244 relative to a plane perpendicular to the axis of barrel 230—approximately 25°

FOURTH EMBODIMENT

FIG. 9 illustrates a fourth embodiment of the invention wherein remote focus adjustment at the outer periphery of the eyeglass frame is also available to impart telescopic focusing motion to a telemicroscope. In the embodiment of FIG. 9 a transparent support plate 300 has non-rotatably mounted therethrough the front barrel 302 of a modified telemicroscope 304. The rear barrel 306 of scope 304 has a smooth sliding fit within the smooth bore of barrel 302. The exit lens 42 is mounted at the rear end of barrel 306 as in the prior embodiments, and an objective lens (not shown) may be mounted in the forward end of barrel 302 in the manner of the first embodiment of FIGS. 1, 2 and 3. A yoke 308 has a pair of curved arms 310 and 312 each slotted as at 314 to receive therein an associated one of a pair of diametrically opposed pins 314 fastened to and protruding exteriorly from the rear end of barrel 306. Yoke 308 has an arm 316 with a T-head 318 which is trunnion mounted by a pivot pin 320 to a pair of ears 322 and 324 protruding rearwardly from a mounting bracket 326 which in turn is adjustably secured to frame 20 by a pair of mounting screws extending through slots 328 and 330. A suitable hair pin coil spring 332 encircles pin 318 and has its ends arranged to spring bias arm 316 for rotation in a direction counter clockwise about the axis of pin 320 as viewed in FIG. 9 (in a direction biasing rear barrel 306 forwardly into front barrel 302 of scope 304). Such pivoting, scope-focusing motion of yoke 308 is variably limited by a traveling nut 334 and the nose of which abuts the forward side of arm 316. Nut 334 is threadably received on a machine screw 336 disposed in a slot 338 with its axis extending lengthwise of the slot. Screw 336 is journalled at its lower end by stub 340 received in a blind bore in plate 300, and is journalled at its upper end, and extends through, a bore in bracket 326. A finger-dial disc 342 is fixedly secured to the upper end 344 of screw 336 for manually imparting rotation thereto. Since nut 334 is trapped against rotation by the sides of slots 338, rotation of screw 336 will threadably move nut 334 up and down therealong to thereby pivot yoke 308 as desired for focusing scope 304. The fourth embodiment thus eliminates the need for screw threaded engagement between the rear barrel 306 and front barrel 302 of scope 304.

FIFTH EMBODIMENT

FIGS. 10 and 11 semi-schematically illustrate a fifth embodiment of the invention in which a telemicroscope 32" is supported in much the same manner as in the first embodiment of FIGS. 1–3. However in place of the pulley and belt drive of the first embodiment, the fifth embodiment employs a remote focusing drive system of the worm gear type. To accomplish this, the front barrel 36' of scope 32" is provided with a worm-engageable helical gear 350 on its outer periphery, and a worm gear 352 is fixed on the lower end of a drive shaft 354 so as to mesh with and rotatably drive gear 350. Shaft 354 is journalled in a bore in frame plate 70 and fixed axially thereto by a collar 356 and a finger rotatable disc 342. Disc 342 is thus accessible at the outer periphery of the eyeglass frame, and the viewer may, by finger rotation of disc 342, accomplish remote focusing of telemicroscope 32" while the same is attached to the supporting eyeglass spectacle frame and while the system is being worn and viewed through by the user. As in the previous embodiments, preferably support 110' as well as shaft 354 and gear 352 are constructed of transparent plastic material. Due to the gear multiplication ratio between worm 352 and gear 350, very fine or small increments of relative axial motion between lenses 40 and 42 may be readily obtained with this remote drive system. The high force multiplication thus obtainable may also be utilized to advantage in the event of a high friction coupling between the front and rear barrels. Movement of front barrel 36 axially relative to rear barrel 38 may be accommodated by making gear 350 long enough axially to remain in meshing engagement with gear 352 throughout the range of focusing relative motion of the barrels In such an arrangement, scope 2" would remain spaced rearwardly from lens 24 as in the second embodiment 32". However, front barrel 36' may remain in abutment with lens 24 and rear barrel 38 moved axially relative to both barrel 36' and lens 24 by substituting the supports 410 or 504 as described hereinafter for support 110'.

SIXTH EMBODIMENT

Figure 12:
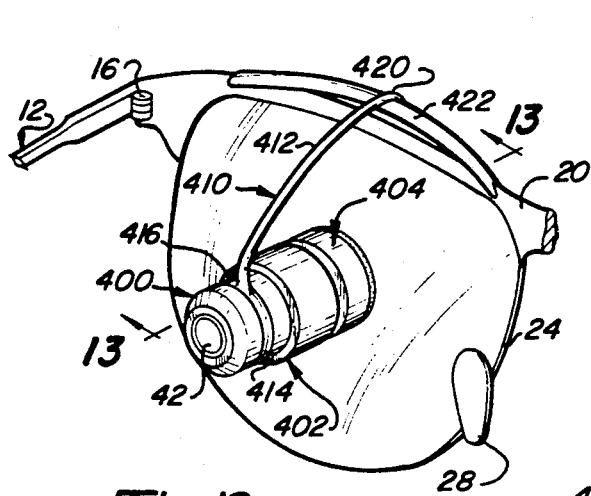
FIG. 12 is a fragmentary perspective rear view of a sixth embodiment of the invention illustrated in association with only the left hand lens and frame portion.
Figure 13:
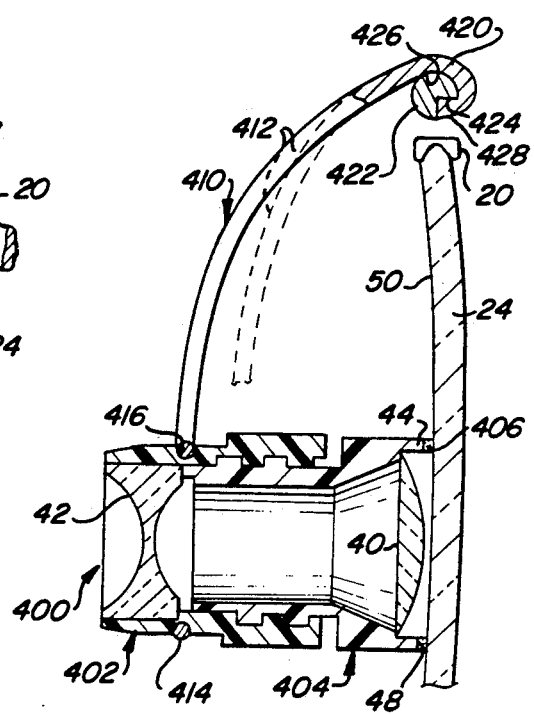
FIG. 13 is a fragmentary vertical cross section view taken on the line 13—13 of FIG. 12.
Figure 14:
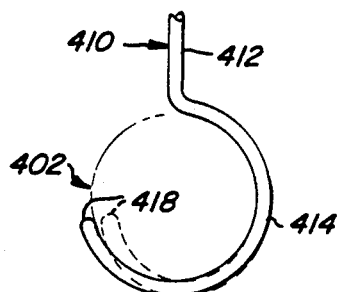
FIG. 14 is a fragmentary semi-schematic view of the scope mounting and adjustment wire utilized in the sixth embodiment of FIGS. 12 and 13.

Referring to FIGS. 12, 13 and 14, the foregoing principles of the present invention are embodied in a simplified arrangement in which the support and remote focusing drive for the telemicroscope are embodied in a single unitary member. The telemicroscope 400 of this embodiment is similar to scope 32' of the second embodiment of FIGS. 4 and 5 in that it has a rear barrel 402 that telescopes over and is threadably coupled to a reduced diameter rearward extension of the front barrel 404 (FIG. 13). However, the front edge 48 of flange 44 of front barrel 404 is provided with an annular gasket 406 made of a suitable soft, high friction co-efficient material such as natural rubber with one semi cured surface, or solvent treated surface or slow setting adhesive to allow for centering. Gasket 406 is thus adapted to abut rear surface 50 of lens 24 and to frictionally grip this surface sufficiently to prevent rotation of front barrel 404 when rear barrel 402 is focus-rotated thereabout.

In accordance with a principle feature of the sixth embodiment, scope 400 is both supported and remotely focused by a bowed, spring wire member 410 operably coupled between scope 400 and eye wire frame 20. Support 410 comprises a curved wire arm 412 having a resilient eye portion 414 at its lower end which is curved through an arc of about 270° and is adapted to snap into a external groove 416 provided in rear barrel 402. As illustrated in FIG. 14, the free end 418 of eye 414 in its free state condition is biased to the phantom line position shown in FIG. 14 such that the inside diameter of loop 414 is slightly smaller than the root diameter of groove 416. Thus forcing eye 414 opens sufficiently to permit the same to snap into groove 416 forces the eye to the solid line state shown in FIG. 14 in order to provide a tight frictional grip of support 410 about rear barrel 402.

The upper end of support 410 is curved into a hook portion 420 which clasps onto an attachment rod 422 which in turn is suitably securely affixed at its opposite ends to frame 20 in the manner schematically indicated in FIG. 12. Rod 422 is designed so as to be curved into an arch above frame 20 having a radius of curvature centered on the axis of scope 400. As best seen in FIG. 13, rod 422 in cross section is circular and has a quarter segment notch 424 opening forwardly and downwardly of the eyeglasses (between the three o'clock and six o'clock positions as viewed in cross section in FIG. 13). Hook portion support 420 is provided with a half circle inner surface 426 adapted to fit closely about the outer periphery of rod 422 around the upper half thereof. Portion 420 terminates in a free end tang 428 which seats in rod notch 424 and serves to key hook portion 420 to rod 422 to prevent relative rotation therebetween about the axis of rod 422 while permitting hook portion 420 to be slid axially along rod 422 in response to finger pressure exerted on hook portion 420 and/or arm 412.

Support 410 may be made of spring wire or other suitable stiff but resilient material and, when mounted on rod 422 as shown in FIG. 13, arm 412 has a free state position schematically shown in phantom by broken lines in FIG. 13. Hence when arm 412 is stressed to its solid line position shown in FIG. 13 by being in mounted engagement with scope 400, support 410 develops a spring biasing force tending to force scope 400 to the right as viewed in FIG. 13 to thereby firmly press gasket 406 into frictional anti-rotational abutment with the inner surface 50 of lens 24. The moment arm developed in arm 412 and exerted on rod 422 is resisted by a suitable secure anchorage of rod 422 on frame 20 such that rod 422 can not rotate or otherwise move relative to eyeglass frame 20 or lens 24.

In the operation of the sixth embodiment, the viewer moves arm 412 to the right or left of its position shown in FIG. 12 to move hook portion 420 slidably along rod 422. This swinging motion of support 410 through an arc of about 45° between its end limits on rod 422 correspondingly rotates rear barrel 402, thereby causing its threaded telescopic engagement with the front barrel 404 to produce relative axial motion between lenses 40 and 42 to thereby focus scope 400. The axial travel of rear barrel 402 in response to such motion is accommodated by the resilience of arm 412 which remains stressed throughout this range of telescopic motion, and by providing sufficient bowing curvature and length to arm 412. If desired, rod 422 also may be mounted to frame 20 with its longitudinal axis at a slight angle to the plane of the spectacle lenses 22 and 24 such that support 410 moves bodily with rear barrel 402 during its axial focusing travel relative front barrel 404. Alternatively, support 410 may be fashioned in the form of a hairpin spring (not shown) so as to have arm 412 first extend generally horizontally rearwardly from its frame end anchor 420, thence through one or more 360° coils, and thence downwardly to spring eyelet 414. This alternative form of spring-support-focusing arm is advantageous in developing greater spring forces, readily accommodates focus axial motion of the rear barrel by swing deflection of the downwardly extending portion of the arm, and may be designed to position the aforementioned spring coil portion in alignment with the skull bone of the wearer above the eye socket. Due to the spring biasing force exerted by support 410 on scope 400 towards lens 24, gasket 406 remains in firm frictional engagement with surface 50 so that forward barrel 404 cannot rotate when rear barrel 402 is rotated by support 410 for focusing.

It thus will be seen that the sixth embodiment of FIGS. 12, 13 and 14 accomplishes support of telemicroscope 400 by abutment contact with lens 24 without requiring permanent afixation therebetween, which in turn provides the many advantages indicated with respect to the previously described embodiments. In addition, remote focusing by the viewer while wearing the eyeglasses is readily achieved from the outer periphery of the eyeglass frame as in the previous embodiments. Due to the simplicity of the structure of the sixth embodiment, the support structure is not readily observable from the front of the eyeglasses and the same presents a minimum obstruction to the viewers vision. The cost of manufacture, installation, service and readjustment is greatly reduced as will be evident to those skilled in the art from the foregoing disclosure.

SEVENTH EMBODIMENT

Figure 15:
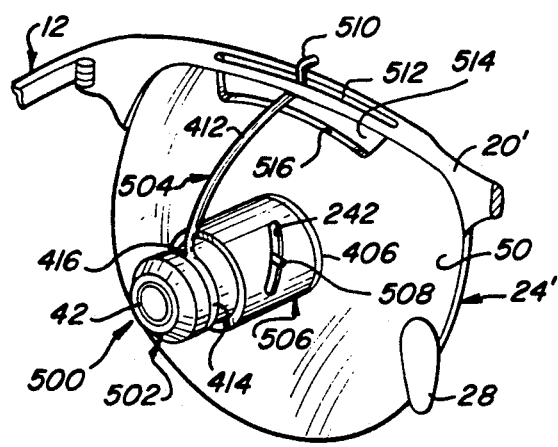
FIG. 15 is a fragmentary perspective rear view of a seventh embodiment of the invention illustrated in association with only the left hand lens and frame portion.

FIG. 15 illustrates a seventh embodiment of the invention which is similar in many respects to the sixth embodiment of FIGS. 12-14. In this embodiment a telemicroscope 500 is provided having a rear barrel 502 which, like barrel 402 of the sixth embodiment, has a groove 416 in which a resilient eye 414 of a single wire support member 504 is received with a snap-on, friction-grip fit. Rear barrel 502, like barrel 230 of the third embodiment of FIGS. 6-8, has a smooth sliding fit within a front barrel 506 of scope 500, which in turn resembles front barrel 220 of the third embodiment. Barrel 506 thus has a pair of diametrically opposed and oppositely inclined slots 242 and 244 and carries the lens 40 therein in the manner of barrel 220. However the forward end edge of barrel 506 is provided with the high friction gasket 406 similar to the sixth embodiment barrel 404. Rear barrel 502 is provided with a pair of diametrically opposed pins, only one such pin 508 being shown in FIG. 15, which respectively protrude through associated slots 242 and 244. Hence when rear barrel 502 is rotated about its axis by swinging support 504, pins 508 riding in slots 242 and 244 cooperates therewith as interrupted threads and produce the telescopic motion in the scope to obtain the relative axial focusing movement of the lenses 40 and 42.

Scope 500 is, like scope 400, spring biased forwardly so that front end gasket 406 is pressed tightly against the rear surface 50 of lens 24' to prevent rotation of front barrel 506. This is accomplished by a modified support arm mounting arrangement in the seventh embodiment. Support 504 comprises a bowed spring wire having its upper end 510 bent oppositely to the curvature of arm 412 to provide an end tang which extends vertically upwardly through a slot 512 formed vertically through a modified eye wire frame 20', as shown in FIG. 15. Slot 512 extends lengthwise a distance sufficient to permit about 45° of swinging movement of support 504 about the axis of scope 500. Lens 24' is cut out along its upper edge to form a notch 514 as defined by a lens slot edge 516 spaced slightly below frame 20' sufficiently to provide clearance between lens 24' and arm 412 of support 504. It is to be understood that end tang 510 has a close sliding clearance fit in slot 512, and that the depth of slot 512 is sufficient to key tang 510 against rotation about the longitudinal axis of eye wire home 20. Arm 412 as viewed in FIG. 15 is in a stressed condition due to the anchorage of tang 510 in slot 512 and hence exerts spring biasing tension tending to drive scope 500 forward into abutment with lens surface 50 as in the sixth embodiment. Focusing of scope 500 is obtained by the wearer-viewer moving tang 510 back and forth along slot 512.

It is to be noted that in both the sixth and seventh embodiments the spring forces developed in supports 410 and 504, in addition to biasing the scopes into frictional abutment with lens 24 and 24' to prevent rotation of the forward barrels 404 and 506, also develops and maintains frictional engagement forces between the upper ends of support 410 and 504 and rod 422 and surfaces of slot 512 respectively. This assists in maintaining the scope in selected adjusted focus position despite jarring and vibrations which may be imparted to the eyeglasses in use. It also will be appreciated that both of these embodiments, like the third embodiment of FIGS. 6-8, are readily adapted to the provision of suitable detent means, such as notches, to thereby obtain predetermined intermediate focus stop positions of the focus control arm supports 410 and 504.

Although the sixth and seventh embodiments do require slight modifications to the eyeglass frame and/or eyeglass lens as described above, such modifications are readily accomplished at less cost than the savings obtained in simplifying the scope and support structure as represented in the sixth and seventh embodiments.

However, in certain instances it may not be necessary to modify the eyeglass frame to receive the combination support and focusing arm 410. For example, some styles of eyeglass frames have a round upper eye wire so as to have a natural arch with a suitable radius of curvature the center of which in many instances falls upon the center of focus of the associated eyeglass lens. In such instances, the upper end of arm 410 may be fashioned to provide a clip on type attachment and an end tang which bears slidably against the upper outer surface of the eyeglass lens. Such eyeglasses are thus ideally suited to readily receive the sixth embodiment of FIGS. 12-14, to support the telemicroscope with its central axis aligned with the optical center of the associated eyeglass lens, which in many instances is a preferred alignment.

It is also to be understood that the telemicroscope of the illustrated embodiments, which is illustrated by way of example herein as being of the Galilean type with spaced front and rear positive and negative lenses may be modified if desired to be constructed as a Keplerian telemicroscope. As is well understood in the art, such a scope may comprise an arrangement of three lenses spaced by associated prisms which may be mounted in suitable arrangement in the telescoping front and rear barrels of the type utilized in the illustrated embodiments.

The interrupted thread provided by the pins 508 in slots 242 and 244 of the seventh embodiment, like the similar interrupted arrangement of the third embodiment of FIGS. 6-8, is advantageous in imparting greater relative axial motion between the front and rear barrels for a given increment of swinging motion of support 504.

From the foregoing description it will now be understood that the telemicroscope system of the invention amply fulfills the aforestated and other objects of the invention. While the invention has been shown and described with reference to the preferred embodiments described and/or illustrated hereinabove, it will now be understood by those skilled in the art from the foregoing disclosure that various changes in form and details can be made therein without departing from the spirit and scope of the invention.

For example it will be understood that the principles of the invention may be applied to the aforementioned Edwards Patent telemicroscope to provide the remote focusing feature of the present invention. The pulley and O-ring belt drive of the first embodiment may be readily adapted to rotatably drive the rear barrel of the permanently-lens-affixed Edwards telemicroscope merely by providing a pair of spaced collars on the rear barrel to define an appropriate pulley groove about which the O-ring belt may be trained.

In addition to the various embodiments of means for supporting and focusing the telemicroscope instruments disclosed by way of preferred examples hereinabove, the foregoing disclosure will now suggest to those skilled in the art other means for supporting and focusing the telemicroscope instruments from at or near the outer periphery of the associated spectacle lens in accordance with the present invention. For example, with reference to the fifth embodiment of FIGS. 10 and 11, the forward barrel 350 and worm gear 352 may be encased within a single housing with shaft 354 protruding therefrom such that the housing is held stationary in abutment with the associated carrier lens 24, gears 352 and 350 being rotatably mounted within the housing so as to not move bodily with respect to the lens 24. In this event, the support yoke 110' may be eliminated, and the rear barrel 38 may protrude rearwardly from the housing and be non-rotatably keyed thereto so that rotation of the forward barrel within the housing will produce axial motion of the rear barrel relative to the front barrel for focusing.

Another variation within the scope of the present invention may take the form of a tubular, spring biasing member somewhat similar to support 504 or 410 fixedly coupled at its upper end to the eyeglass frame and at its lower end to a telemicroscope. A rotatable drive wire is encased in the spring tube, somewhat similar to a Bowden wire cable drive, for imparting rotational motion to a rotational portion of the telemicroscope to thereby produce relative axial motion to an associated non-rotary portion of the telemicroscope.

Hence, such changes are intended to be encompassed within the spirit and scope of the invention as limited only by the appended claims and the applicable prior art.

I claim:

1. In spectacles comprising a carrier eyeglass frame adapted to be supported on a wearer and carrying spectacle lenses adapted to be positioned by said frame in front of the eyes of the wearer, and a multiple lens optical instrument mounted posteriorly relative to at least one of the lenses, so as to extend from a front lens of the instrument disposed at about said one spectacle lens toward the wearer's eye such that a rear exit lens of said instrument is adapted to be disposed adjacent the wearer's eyelash, said instrument being located between the wearer's eye and one of said spectacle lens, said optical instrument being adjustable in optical length for focal adjustment thereof, the improvement in combination therewith of means remote from said instrument for focusing said instrument and directly mounted on said spectacles from at or near the outer periphery of said one spectacle lens and operable therefrom for effecting such instrument focal adjustment.

2. The combination as set forth in claim 1 including supporting means engaging said instrument about its periphery for suspending said instrument from at or near the outer periphery of the associated spectacle lens.

3. The combination as set forth in claim 2 wherein said focusing means and said supporting means comprise a unitary spring support and swingable focusing arm biasing said instrument into front end abutment with the rear surface of the associated spectacle lens.

4. The combination as set forth in claim 3 wherein said focusing and support means arm comprises a support yoke made of resilient biasing material operably coupled at one end to said eyeglass frame and at another end to said instrument for biasing the same into abutment with the rear surface of the eyeglass lens and swingable about the axis of said instrument to impart focal adjustment thereto.

5. The combination as set forth in claim 2 wherein said focusing means comprises drive means operatively rotatably coupled to a focus rotational portion of said instrument and having a movable member exposed beyond the periphery of said eyeglass frame accessible for manually imparting driving force to said drive means to thereby vary the focus of said instrument.

6. The combination set forth in claim 5 wherein said support means comprises a spring wire yoke having an instrument engaging portion operable to exert spring bias gripping force on a non-rotary portion of said instrument to prevent rotation thereof and to exert spring bias force on the instrument to force the front end of said instrument non-rotatably against the inner surface of said one lens.

7. The combination set forth in claim 6 wherein said instrument comprises front and rear barrels telescopable relative to one another and threadably intercoupled to produce relative axial motion therebetween, said non-rotary portion of said instrument comprising said rear barrel and being partially encircled by said yoke, said focus rotational portion of said instrument comprising said front barrel.

8. The combination set forth in claim 5 wherein said drive means movable member comprises a pulley wheel rotatably mounted on said eyeglass frame and a drive belt trained about said pulley and said focus rotational portion of said instrument for transferring rotary motion of said pulley to said focus rotational portion.

9. The combination as set forth in claim 8 wherein said belt contains a half twist to provide crossed belt runs between said pulley and said instrument.

10. The combination set forth in claim 8 wherein said pulley is mounted on said support means and said support means includes yoke means adjustably fastened to said eyeglass frame for adjustment movement positioning laterally of said eyeglass frame parallel to the plane of said spectacle lenses.

11. The combination set forth in claim 5 wherein said drive means movable member comprises a control arm protruding radially outwardly from said instrument and terminating at an end tip portion disposed above the elevation of an upper portion of said eyeglass frame, and said support means comprises a bracket mounted at its upper end to said upper portion of said eyeglass frame and carrying at its lower end a non-rotary portion of said instrument, said rotatable portion of said instrument being slidably telescopically received within said non-rotatable portion, said non-rotatable portion having oppositely inclined diametrically opposed slots therein, said control arm having a bail fork at its lower end with inturned ends protruding individually through associated ones of said slots and into engagement with said rotary portion of said instrument such that swinging movement of said control arm imparts rotary motion to said rotary portion of said instrument to move the same axially relatively to said non-rotatable portion of said instrument.

12. The combination set forth in claim 11 wherein said support means has a guide slot through which said control arm protrudes and defining end limit stops to determine the range of swinging motion of said control arm correlated with the range of focal adjustment of said instrument.

13. The combination set forth in claim 12 wherein said control arm guide slot means includes yieldable plural detent means disposed at pre-selected locations in the path of travel of said control arm in said guide slot means correlated with predetermined plural focal adjustments of said instrument.

14. The combination set forth in claim 13 wherein said support means includes bracket means and associated fastening means cooperable to enable selected adjusted positioning of said instrument laterally of said eyeglass frame by bodily movement of the same in a plane parallel to the eyeglass spectacle lens.

15. The combination set forth in claim 14 wherein said detent means is movable with said guide slot means of said support means as well as relative thereto.

16. The combination set forth in claim 2 wherein said support means comprises a bracket affixed at one end to said eyeglass frame and said instrument comprises a front and rear barrel axially telescopicable relative to one another and housing said front and rear lenses respectively, said focusing means comprising an arm pivotally coupled at one end to said rear barrel and at its other end pivotally coupled to said fixed end of said bracket for swinging motion about an axis disposed adjacent said eyeglass frame so as to be movable in a plane perpendicular to the associated spectacle lens, spring means for biasing said swinging arm towards the associated spectacle lens, said focusing means further comprising a rotatable lead screw journalled in support means and having a traveling nut threadable therealong to provide a variable stop to limit swinging motion of said arm toward the associated eyeglass lens to thereby determine the focal adjustment of said instrument.

17. The combination as set forth in claim 5, wherein said instrument comprises front and rear barrels housing said front and rear lens respectively, said front barrel comprising said focus rotational portion of said instrument and having gear means fixed thereto, said rear barrel comprising the non-rotary portion of said instrument and being non-rotatably coupled to said support means for movement of said rear barrel axially relative to said front barrel, said drive means further including a worm gear in driving meshing engagement with said gear means of said front barrel and having an associated rotatable drive shaft extending from said worm gear to a point beyond the outer periphery of the associated spectacle lens, and a finger dial secured to the remote end of said drive shaft for imparting rotary movement thereto to adjust the focus of said instrument.

18. The combination set forth in claim 4 wherein said instrument comprises a front barrel and rear barrel telescopicable relative to one another and threadably intercoupled such that relative rotation therebetween moves said lenses axially relative to one another for focal adjustment of said instrument, said arm having a means at said other end thereof non-rotatably coupled to said rear barrel such that swinging movement of said arm produces rotation of said rear barrel, said front barrel being held against rotation against said associated spectacle lens.

19. The combination set forth in claim 18 wherein said front barrel has anti-rotation means mounted on the front end thereof abuttably engageable with the inner surface of said associated spectacle lens for holding said front barrel against rotation relative to said associated spectacle lens.

20. The combination set forth in claim 19 wherein said anti-rotation means comprises a gasket means affixed to the front end of said front barrel and having a surface engaged with said spectacle lens inner surface and made of a material having a high co-efficient of friction sufficient to prevent rotation of said front barrel relative to said associated spectacle lens.

21. The combination set forth in claim 18 wherein said eyeglass frame includes means operably coupled to said one end of said arm including means for keying said arm one end against rotation in a plane transverse to the plane of the spectacle lens and for slidably supporting said one end for movement in a plane parallel to said spectacle lens.

22. The combination set forth in claim 21 wherein said eyeglass frame keying means comprises a slot in said eyeglass frame with said one end of said arm protruding therethrough.

23. The combination set forth in claim 19 wherein said means non-rotatably coupling said other end of said arm to said rear barrel comprises a terminal portion of said arm formed into a open eyelet dimensioned to receive and resiliently grip therein said rear barrel.

24. In spectacles comprising a carrier eyeglass frame adapted to be supported on a wearer and carrying spectacle lenses adapted to be positioned by said frame in front of the eyes of the wearer, and a multiple lens optical instrument mounted posteriorly relative to at least one of the lenses, so as to extend from a front lens of the instrument disposed at about said one spectacle lens toward the wearer's eye such that a rear exit lens of said instrument is adapted to be disposed adjacent the wearer's eyelash, so that said instrument is located between the wearer's eye and one of said spectacle lens, the improvement in combination therewith of light baffle means disposed internally of said instrument between said front and rear lenses comprising a plurality of internal annular teeth formed in an array to define an inner peripheral surface of said instrument coaxial with an optical axis operably defined between said lenses, each of said teeth having a front face oriented toward said front lens and disposed in a plane generally perpendicular to said optical axis and a rear face oriented toward said rear lens disposed at an acute angle to said front face and intersecting the same to define a sharp inner peripheral edge of said teeth.

* * * * *